Jan. 1, 1957
H. J. SCHLAFLY
2,776,102
CAMERA SUPPORT
Filed Oct. 4, 1952
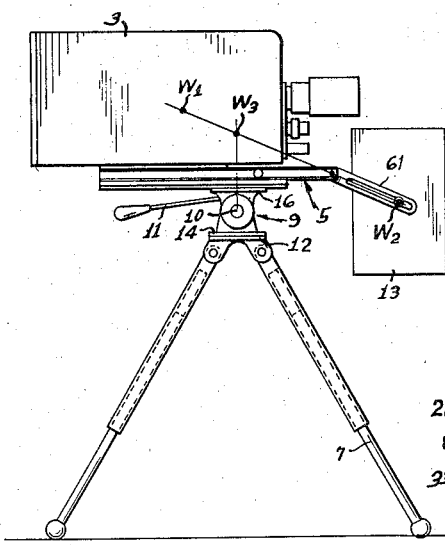
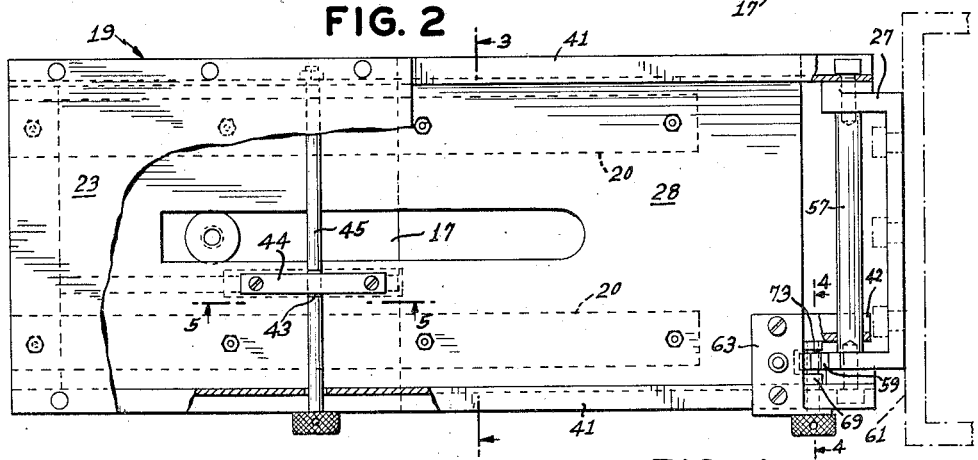
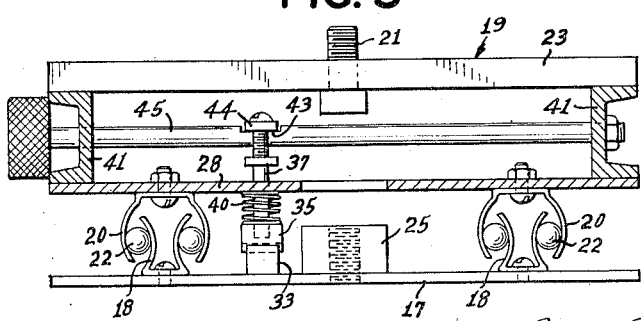
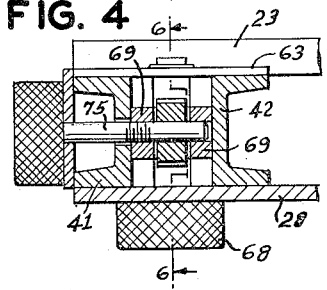
INVENTOR
*Hubert J. Schlafly*
BY
*Pennie, Edmonds, Morton, Barrows and Taylor*
ATTORNEYS

United States Patent Office 2,776,102
Patented Jan. 1, 1957

2,776,102

CAMERA SUPPORT

Hubert J. Schlafly, St. Albans, N. Y., assignor to Teleprompter Corporation, New York, N. Y., a corporation of New York Application October 4, 1952, Serial No. 313,121

4 Claims. (Cl. 248—178)

This invention relates to balancing devices and more particularly to devices for the balanced support or mounting of loads of variable weight and spatial configuration so that for example such loads can be swung at will about horizontal axes with a minimum of effort. The balancing device of the invention has useful application in the support of motion picture and television cameras which are required to be readily maneuverable in both horizontal and vertical planes, for appropriate orientation of the taking lens with respect to the action.

In the motion picture and television arts it is known to support cameras on tripods or similar bases by means of swiveling mounts which permit their rotation in both horizontal and vertical planes. It is customary to support such cameras from beneath so that, except for a unique orientation of the camera in elevation, the center of gravity of the camera will not overlie the horizontal axis about which the camera is rotated. Consequently for all other positions of the camera in elevation there will exist a moment of forces due to gravity tending to rotate the camera farther about that axis.

It his been proposed heretofore to provide frictional or resilient means to counteract this moment, so that the camera may be stabilized in any desired position about its horizontal axis with a minimum of required effort from the operator, and the swiveling mounts currently used for the support of such cameras are often called "friction heads." These friction heads can at best effect compensation of the moment above referred to only for a camera of such size and construction that when fastened to the friction head its center of gravity will overlie the horizontal axis of rotation when the camera is in a preferred position such as that which orients the axis of the taking lens horizontally, for which position the friction head is designed to exert zero restoring torque. In view of the necessity of changing lenses, some of which are heavy, and of attaching accessories of one sort or another to the camera, the friction heads hitherto employed do not in practice offer complete compensation even for a given camera. The effective center of gravity of a camera employed for motion pictures or television is in practice frequently displaced by the affixation to the camera of other accessories besides the various lenses which may need to be employed. For example, soundproofing boxes may be required to shield sound microphones from the noise of the camera mechanism. It may be required to support spotlights in fixed position relative to the camera so that they may move therewith, preferably by mounting them on the camera. Similarly masking or vignetting devices and sunshades are also often employed, and it has become desirable to support in fixed position relative to the camera prompting devices for the automatic and continuous presentation to the actors of the script of their performance.

The present invention provides a camera mount or balancing device whereby any desired camera with any combination of lenses and other accessories such as those described above can be assembled into a rigid unit and correctly balanced on a universal swivel or friction head. By the phrase "correctly balanced" it is meant to state that with the camera in a preferred position such as that which positions the axis of the taking lens horizontally, a true balance is obtained with the center of gravity of the combination of camera and accessories overlying the horizontal axis of rotation in the friction head.

In the accompanying drawings:

Fig. 1 is a view in side elevation of one embodiment of the camera mount of the invention, shown in use supporting a television camera from a tripod via a friction head which permits motion of the camera in azimuth and elevation;

Fig. 2 is a partially cut away plan view of the camera mount of Fig. 1;

Fig. 3 is a sectional view on the line 3—3 of Fig. 2;

Fig. 4 is a sectional view on the line 4—4 of Fig. 2;

Fig. 5 is a sectional view on the line 5—5 of Fig. 2; and

Fig. 6 is a sectional view on the line 6—6 of Fig. 4.

In Fig. 1 a camera 3 is shown resting upon the camera mount 5 of the invention. The amount is supported from a tripod 7 by means of a friction head 9. In use, the camera mount and the upper portion of the friction head are maintained in fixed position relative to each other. The friction head includes a lower plate 12 fixed with reference to the tripod, and the remainder of the head rotates with respect to the plate 12 about a vertical axis at a bearing surface between the plate 12 and the overlying plate 14. The upper plate 16 of the friction head is rotatable with respect to the plates 12 and 14 about a horizontal axis indicated at 10, and it is provided with a suitable flat surface for support of the camera mount, which may be bolted or otherwise fastened thereto. The head includes resilient means linking the plates 14 and 16 and which exerts a restoring torque whenever the two are displaced from the parallel relation shown in the figure. Frictional resistance may also be employed to restrain relative motion of the plates 14 and 16 about the axis 10. A lever 11 connects with the upper plate 16 and permits swinging of the camera in azimuth and elevation, rotation in elevation being about the axis 10.

The center of gravity of the camera is indicated at the point $W_1$, which symbol also represents the weight of the camera. The mount 5 carries at its front end a prompting device 13 for presentation of the script to the performers whose action is to be televised or photographed. The center of gravity of the device 13 is indicated at $W_2$, and the center of gravity of the camera and prompting device together is indicated at $W_3$, located at a point on the line joining $W_1$ and $W_2$ which divides that line into portions inversely proportional to the weights $W_1$ and $W_2$. By suitable adjustment of the mount of the invention (whose weight is small compared to that of the camera and its accessories), the point $W_3$ may be brought to lie substantially in the vertical plane containing the axis 10, about which the camera, mount and prompting device rotate together in elevation. Thus the mount of the invention permits positioning of the camera and of any accessories fixed relative thereto in such a position with respect to the friction head that the center of gravity of the combination overlies the friction head, and more particularly its horizontal axis of rotation, for a "standard" position of the camera in elevation. This minimizes the resistance to be presented by the friction head and the effort to be expended by the operator in maintaining the camera in a different position in elevation to which it may be desired to turn it.

In the embodiment of the invention shown in the drawings, the camera mount comprises a plate 17 affixable to the friction head or other supporting means, and a frame generally indicated at 19 to which the camera and accessories may be affixed. As indicated in Fig. 3, a stud 21 threads from the upper plate 23 of the frame 19 into the camera. A bracket 27 adjustably fixable with respect to the frame 19 supports the accessory 13 in any desired position with respect to the camera. The mount as a whole is fastened to the friction head by a stud such as indicated at 25, passing from the friction head into the plate 17.

The plate 17 and frame 19 engage each other adjustably at a pair of rails 18, affixed to the plate 17, and the frame rides on the rails 18 by means of channels 20. Ball bearings 22 may be provided between the rails and the channels to facilitate their relative motion. The plate 17 is preferably affixed to the friction head with the long dimension of the rails perpendicular to the horizontal axis of rotation 10 in the friction head, so that adjustment of the relative position of the frame on the rails may effect balancing of the camera and accessories affixed to the frame 19 over that axis. The camera is moreover preferably affixed to the frame with the axis of its taking lens parallel to the length of the channels 20.

To permit locking of the frame and rails in any desired relative position, releasably lockable interengaging means are provided between the frame and plate 17. In a preferred embodiment of the invention this means takes the form of the racks 33 and 35 shown in Figs. 2, 3 and 5. Rack 33 is fixed to plate 17, and rack 35 is mounted on a carriage in the frame for limited motion to permit disengagement of the two racks. As seen in Fig. 3, rack 33 is pinned or otherwise fastened to plate 17 along the long dimension of the plate i. e. parallel to the length of rails 18, and the rack 35 is mounted in the frame parallel to the channels 20. Racks 33 and 35 may therefore engage for all relative positions of the frame 19 and plate 17.

The carriage to which rack 35 is affixed comprise bearing rods 37 journaled at suitable holes in lower plate 28 of frame 19 between its side members 41 (Fig. 3) and a cross member 44 affixed to rods 37, to which rack 35 is also affixed. Coil springs 40 engaged about rods 37 between the rack 35 and plate 28 stress the rack 35 toward the plate 17 to bring the racks 33 and 35 into engagement. A shaft 45 journaled crosswise of the rails and channels at the side members 41 is provided with a milled out cam portion 43 engaging cross member 44 of the carriage. Rotation of the shaft 45 permits the rack 35 to be manually retracted by the operator to disengage the racks when a change in position of the camera is desired, in order to rebalance it as for example upon a change of the camera lens.

The side members 41 of frame 19 may extend to a substantial distance beyond the end of the channels 20 for accommodation of the accessory-supporting bracket 27. A shaft 57 journaled in the side members transversely thereof at their front ends supports a toothed sector 59 seen in side elevation in Fig. 6. The bracket 27 is affixed to or is made integral with the sector 59 and rotates therewith.

By appropriate rotation of sector 59 the bracket 27 may be given any desired orientation with respect to the frame 19, and the accessories supported from the bracket 27 may be given any desired position with respect to the frame and the camera which is affixed thereto.

The sector 59 is controlled in position by means of a pin 75 which may be engaged between any adjacent teeth of the sector. Rearwardly of the shaft 57 a transverse horizontal member 63 is supported from one side member 41 and from a longitudinal member 42. A screw 66 is journaled in member 63 and plate 28 to rotate with respect to the frame without axial motion. A grip 68 is provided for rotation of the screw. A nut 69 is threaded onto the screw between the member 63 and plate 28 and is dimensioned to engage the adjacent side member 41 and the member 42 so as to be blocked from rotation with respect to the frame. Rotation of the screw 66 accordingly raises and lowers the nut 69. The nut is slotted at 73 (Fig. 2) to admit the teeth of the sector 59, and is bored in a direction parallel to the shaft 57 to accommodate the pin 75. The pin when extended across the slot 73 engages the space between two teeth of the sector, and determines subject to vertical motion of the nut the angular position of the sector and hence that of the bracket 27 about their common axis of rotation in the shaft 57. For locking, the pin 75 may be provided with a short threaded portion engaging a threaded bore in the near side of the nut, as shown in Fig. 4. The range of travel of the nut 69 on the screw 66 is made sufficient to rotate the sector 59 on the shaft 57 through the angle separating two adjacent teeth so that by selection of proper teeth for engagement with the pin 75 and by adjustment of the nut, any angular position may be given to the bracket 27 relative to the frame.

The bracket 27 may be provided with bores or other means for the attachment of accessories thereto, such as the prompting unit 13 shown in the drawings, which is supported from the bracket by means of a yoke 61.

In use, the camera to be employed is affixed to the frame 19 together with the accessories to be employed therewith, the latter by suitable adjustment of the bracket 59. The camera with the frame and the plate 17 engaged therein may then be lifted over the friction head so that the bolt 25 from the friction head may engage with the plate 17. The bolt, or other means for coupling plate 17 to the friction head, is then drawn into a snug but not a tight fit, so that the frame with the superposed camera can slide over the upper plate of the friction head. Coarse and fine adjustments to the relative position of the camera and friction head are then made by selecting proper engagement of the racks 33 and 35 and by rotation of the shaft 45 respectively until proper balance is achieved. For these adjustments the frictional coupling of the two halves of the friction head is advantageously relaxed. Upon attainment of proper balance the friction head may be tightly engaged with the plate 17, drawing the lower plate 28 of the frame into tight engagement with the friction head.

The invention has been described hereinabove in terms of a single preferred embodiment. Numerous changes in the details of construction may be made therein without departing from the invention as defined in the appended claims. For example, other forms of interengaging means capable of engagement in a plurality of relative positions may be employed in place of the racks 33 and 35 shown. The racks, if employed, need not be of equal length, and one of them may be reduced to a few teeth or to a single tooth. A single rail may be employed to guide the frame in its motion relative to the upper half of the friction head. Moreover other mechanisms may be provided for effecting adjustment of the accessory-supporting bracket relative to the frame of the mount. The bracket may be provided with a sector of a worm wheel engaging a worm journaled in the frame, for example.

I claim:

1. Apparatus for the balanced support in fixed relative position of a camera and related accessory device, said apparatus comprising a base member adapted to be affixed to the upper portion of a camera swivel, a pair of rails arranged on said base member, a frame member adapted to be affixed to the underside of a camera, said frame member being supported on said rails, a first rack affixed to one of said members, a second rack movably mounted in the other of said members for movement transversely of its own length into and out of engagement with said first rack, a toothed sector journaled at one end of said frame member for rotation about an axis transverse of the direction of relative motion between said members, an accessory supporting yoke affixed to said sector, the arms of said yoke extending in a direction generally away from said frame member, and a pin movably supported in said frame member in position to releasably engage the teeth of said sector, whereby a camera and an accessory device mounted on said accessory supporting yoke may by adjustment of the relative position of said members be supported in balanced relation to said swivel.

2. An adjustable camera support comprising a base adapted to be affixed to the upper portion of a swivel mount, a pair of rails arranged on said base, a first plate adapted to be affixed to the underside of a camera, a second plate fixed with respect to said first plate, said second plate having affixed thereto a pair of channels engaging said rails, means to lock said plates with respect to said base in a plurality of positions lengthwise of said rails, a shaft mounted between said plates adjacent one end thereby and extending transversely of said channels, a toothed sector mounted on said shaft, a yoke having slotted side arms affixed to said sector, a screw journaled in said plates for rotation relative thereto without axial motion, a nut engaging said screw, and a pin arranged on said nut in position to be retractably extended between adjacent teeth of said sector, whereby the combined center of gravity of a camera and an accessory respectively affixed to said first plate and to said yoke may be adjusted in position lengthwise of said rails.

3. Apparatus for the balanced support in fixed relative position of a camera and related accessory device, said apparatus comprising a base mountable on a tripod for swiveling motion, a pair of rails arranged on said base, a camera frame supported on said rails for motion lengthwise thereof, means to prevent relative motion of said base and camera frame in directions perpendicular to the length of said rails, an accessory-supporting bracket arranged at one end of said frame for rotation about an axis transverse to the length of said rails, said bracket having arms extending in a direction generally away from said frame, means to lock said bracket in a plurality of angular positions relative to said frame, and two-part interengaging means for fixing the position of said frame lengthwise of said rails, one part of said last-named means being arranged on said frame and the other being arranged on said base.

4. Apparatus for the balanced support in fixed relative position of a camera and related accessory device, said apparatus comprising a base mountable on a tripod for swiveling motion, a pair of rails arranged on said base, a camera frame supported on said rails for motion lengthwise thereof, means to prevent relative motion of said base and frame in directions perpendicular to the length of said rails, a first rack affixed to said base, a second rack movably mounted in said frame for movement transverse of its length into and out of engagement with said first rack whereby said frame may be locked with respect to said base in a plurality of relative positions, a toothed sector journaled in said frame adjacent one end thereof for rotation about an axis transverse to the length of said rails, an accessory-supporting yoke affixed to said sector, said yoke having side arms including means for the support of an accessory at a plurality of positions along the length of said side arms, and a pin movably supported in said frame in position to be retractably extended between adjacent teeth of said sector, whereby the combined center of gravity of a camera affixed to said frame and an accessory affixed to said accessory-supporting yoke may for any angular position of said sector be adjustably positioned lengthwise of said base.

References Cited in the file of this patent
UNITED STATES PATENTS

| | | |
|---|---|---|
| 1,472,283 | Smith | Oct. 30, 1923 |
| 1,955,969 | Marzolf | Apr. 24, 1934 |
| 1,971,486 | Jennings | Aug. 28, 1934 |
| 2,324,842 | Huebner | July 20, 1943 |
| 2,624,252 | Judd | Jan. 6, 1953 |